US008644671B2

(12) United States Patent
Song

(10) Patent No.: US 8,644,671 B2
(45) Date of Patent: Feb. 4, 2014

(54) DISPLAY APPARATUS, DISPLAY SYSTEM, AND CONTROL METHOD THEREOF

(75) Inventor: Ki-ho Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1296 days.

(21) Appl. No.: 11/772,422

(22) Filed: Jul. 2, 2007

(65) Prior Publication Data

US 2008/0094525 A1 Apr. 24, 2008

(30) Foreign Application Priority Data

Oct. 20, 2006 (KR) ........................ 10-2006-0102395

(51) Int. Cl.
H04N 5/765 (2006.01)

(52) U.S. Cl.
USPC .......................................... 386/231; 386/234

(58) Field of Classification Search
USPC ................................................ 386/231, 234
See application file for complete search history.

(56) References Cited

U.S. PATENT DOCUMENTS

| 5,493,299 | A * | 2/1996 | Song et al. .................... 341/141 |
| 7,680,840 | B2 | 3/2010 | Jung et al. |
| 2002/0056501 | A1* | 5/2002 | Bingel et al. .................... 156/64 |
| 2005/0168658 | A1 | 8/2005 | Woolgar et al. |
| 2005/0172332 | A1 | 8/2005 | Fukuda et al. |
| 2005/0198663 | A1* | 9/2005 | Chaney et al. .................. 725/38 |
| 2005/0223411 | A1 | 10/2005 | Jung et al. |
| 2006/0095596 | A1* | 5/2006 | Yung et al. ........................ 710/5 |
| 2006/0103681 | A1* | 5/2006 | Choi et al. ..................... 345/661 |
| 2006/0183602 | A1* | 8/2006 | Astilean ............................ 482/7 |
| 2006/0238524 | A1* | 10/2006 | Hsieh et al. .................... 345/204 |
| 2006/0256241 | A1* | 11/2006 | Suzuki et al. ................. 348/706 |
| 2006/0288365 | A1* | 12/2006 | Jeong ................................ 725/39 |
| 2007/0024462 | A1* | 2/2007 | Kitaura .................... 340/825.22 |
| 2008/0098318 | A1* | 4/2008 | Kim et al. ...................... 715/765 |
| 2009/0262256 | A1* | 10/2009 | Asayama et al. ............. 348/738 |

FOREIGN PATENT DOCUMENTS

| EP | 0998704 B1 | 4/2003 |
| JP | 2001-356851 A | 12/2001 |
| JP | 200329729 A | 1/2003 |
| JP | 2005109703 A | 4/2005 |
| JP | 2005250342 A | 9/2005 |
| KR | 1020040104722 A | 12/2004 |
| KR | 10-0631556 B1 | 10/2006 |

OTHER PUBLICATIONS

Communication dated Dec. 2, 2011 from the European Patent Office in counterpart European application No. 07115612.9.
Communication dated Nov. 23, 2012 from the Korean Intellectual Property Office in a counterpart application No. 10-2006-0102395.
Communication dated Jul. 24, 2013, issued by the European Patent Office in counterpart European Application No. 07 115 612.9.

* cited by examiner

Primary Examiner — Thai Tran
Assistant Examiner — Jose Mesa
(74) Attorney, Agent, or Firm — Sughrue Mion, PLLC

(57) ABSTRACT

A display apparatus includes: a display unit; a high definition multimedia interface (HDMI) through which an external device can be connected; a user input unit; a user interface (UI) generator; and a controller which outputs a command signal for generating a UI for external device through the HDMI if a control signal for generating the UI for external device is input to the user input unit, and controls the UI generator to display the UI for the external device on the display unit based on UI data input from the external device.

18 Claims, 6 Drawing Sheets

DISPLAY APPARATUS, DISPLAY SYSTEM, AND CONTROL METHOD THEREOF

CROSS-REFERENCE TO RELATED APPLICATIONS

This application claims priority from Korean Patent Application No. 10-2006-0102395, filed on Oct. 20, 2006 in the Korean Intellectual Property Office, the entire disclosure of which is incorporated herein by reference.

BACKGROUND OF INVENTION

1. Field of Invention

Apparatuses and methods consistent with the present invention relate to a display apparatus, a display system, and a controlling method thereof, and more particularly, to a display apparatus to which an external device can be connected, a display system, and a control method thereof.

2. Description of the Related Art

Recently, a display apparatus such as a television is connected with an external device such as an audio/video device, and various interfaces are provided so as to connect an external device, which is an image source, to the display apparatus. The interface that connects the display apparatus and the image source can be divided into an analog interface and a digital interface depending on the type of a video signal, and the display apparatus and the image source is connected by a cable designed in accordance with a protocol that supports the interface. The cable may vary depending on the protocol of the interface.

Although the external device (i.e., image source) is connected to the display apparatus, the display apparatus only performs a display function, and therefore, a remote controller that can control the display apparatus cannot control the external device.

FIG. 1 is a schematic diagram of a conventional display system.

As shown in FIG. 1, a digital versatile disk (DVD) player 20 as an external device is connected to a display apparatus 10 through a predetermined cable 30. Typically, the cable 30 includes an audio cable for transmitting an audio signal and a video cable for transmitting a video signal.

A user can remotely control the display apparatus 10 by using a first remote controller 15, and the user can set or change a display state through an on screen display (OSD), which is one of user interfaces (UIs). The user additionally uses a second remote controller 25 to use an OSD supported by the DVD player 20 or to control the DVD player 20.

However, if a format of a video signal output from the DVD player 20 cannot be supported by the display apparatus 10, the video signal cannot be appropriately displayed on the display apparatus 10, and accordingly, the OSD of the DVD player 20 cannot be displayed on the display apparatus 10 either.

SUMMARY OF THE INVENTION

Accordingly, it is an aspect of the present invention to provide a display apparatus which can display an external device UI by using a control signal received through a user input unit of the display apparatus, a display system, and a control method thereof.

Additional aspects of the present invention will be set forth in part in the description which follows and, in part, will be obvious from the description, or may be learned by practice of the present invention.

The foregoing and/or other aspects of the present invention can be achieved by providing a display apparatus comprising: a display unit; a high definition multimedia interface (HDMI) through which an external device can be connected; a user input unit; a user interface (UI) generator; and a controller which outputs a command signal for generating a UI for external device through the HDMI when a control signal for generating the UI for external device is input to the user input unit, and controls the UI generator to display the UI for the external device on the display unit based on UI data input from the external device.

According to an aspect of the invention, the display apparatus further comprises a HDMI cable which is connected to the HDMI and includes a consumer electronics control (CEC) line, wherein the command signal and the UI data for the UI for external device are transmitted through the CEC line.

According to an aspect of the invention, the UI for external device comprises an item list having a plurality of items, and when one item is selected among the plurality of items, the controller outputs a command signal for the selected item through the HDMI.

The foregoing and/or other aspects of the present invention can be achieved by providing a control method of a display apparatus having a high definition multimedia interface (HDMI) through which an external device can be connected, the control method comprising: receiving a control signal for generating a user interface (UI) for external device; outputting a command signal for generating the UI for external device through the HDMI; and generating the UI for external device based on UI data input from the external device.

According to an aspect of the invention, the display apparatus further comprises a HDMI cable connected to the HDMI and including a consumer electronics control (CEC) line, and the command signal and the UI data for the UI for external device are transmitted through the CEC line.

The foregoing and/or other aspects of the present invention can be achieved by providing a display system comprising: a display apparatus; and an external device that can be connected to the display apparatus, the display system comprising: a display unit; a first high definition multimedia interface (HDMI); a user input unit; a user interface (UI) generator; and a display apparatus controller which outputs a command signal for generating a UI for external device through the first HDMI when a control signal for generating the UI for external device is input to the user input unit, and controls the UI generator to display the UI for external device on the display unit based on UI data input from the external device, the external device comprising: a second HDMI: a UI storage unit which stores the UI data; and an external device controller which outputs the stored UI data through the second HDMI when receiving the command signal for generating the UI.

According to an aspect of the invention, the display system further comprises an HDMI cable which is connected to the first HDMI and the second HDMI, and comprises a consumer electronics control (CEC) line, wherein the command signal and the UI data for the generating the UI are transmitted through the CEC line.

According to an aspect of the invention, the UI for external device comprises an item list including a plurality of items, and when one of the plurality of items in the item list is selected, the display apparatus outputs a command signal for the selected item through the first HDMI.

According to an aspect of the invention, when the command signal for the selected item is input, the external device outputs sub-item data of the selected item through the second HDMI.

According to an aspect of the invention, the UI for external device comprises a resolution window for controlling resolution data and resolution of a video signal output from the external device, and when the user input unit receives a control signal for controlling the resolution of the video signal, the external device controls the resolution of the video signal according to the control signal.

The foregoing and/or other aspects of the present invention can be achieved by providing a control method of a display system comprising an external device, a display apparatus having a display unit, and a high definition multimedia interface (HDMI) which connects the display apparatus and the external device, the control method comprising: receiving a control signal for generating a UI for external device; outputting a command signal for generating the UI for external device to the external device through the HDMI; outputting stored UI data to the display apparatus through the HDMI when receiving the command signal for generating the UI for external device; and generating the UI for external device based on the UI data received from the external device, and displaying the generated UI for external device on the display unit.

According to an aspect of the invention, the UI for external device displayed on the display unit comprises a resolution window for controlling resolution data and resolution of a video signal output from the external device, and the control method further comprises: receiving a control signal for controlling the resolution of the video signal; outputting a command signal for controlling the resolution to the external device; and controlling the resolution of the video signal.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
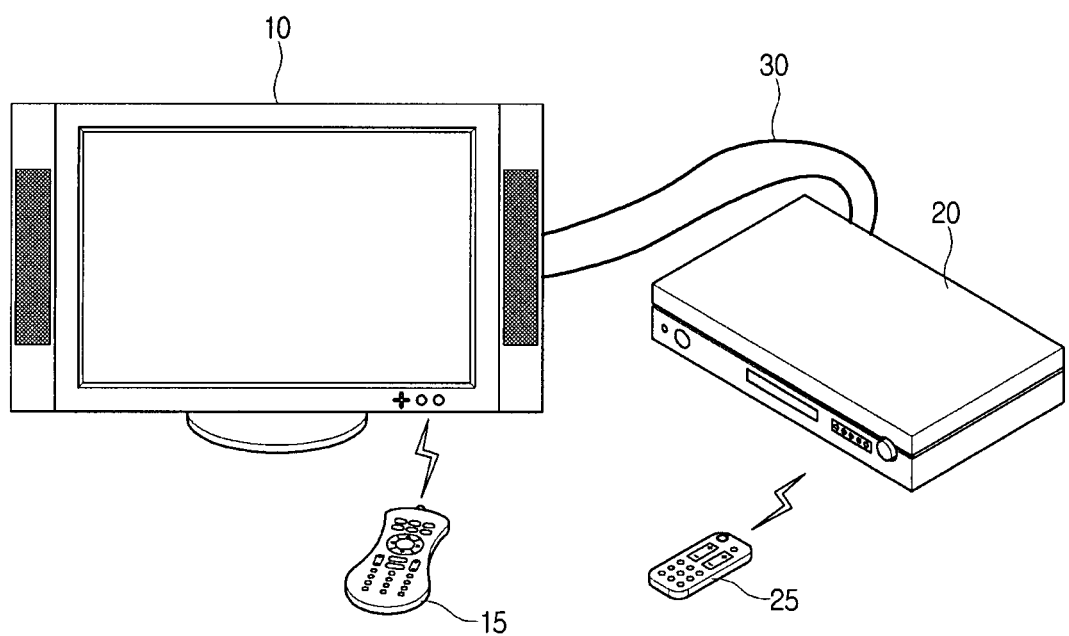
FIG. 1 is a schematic diagram of a conventional display system.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Figure 2:
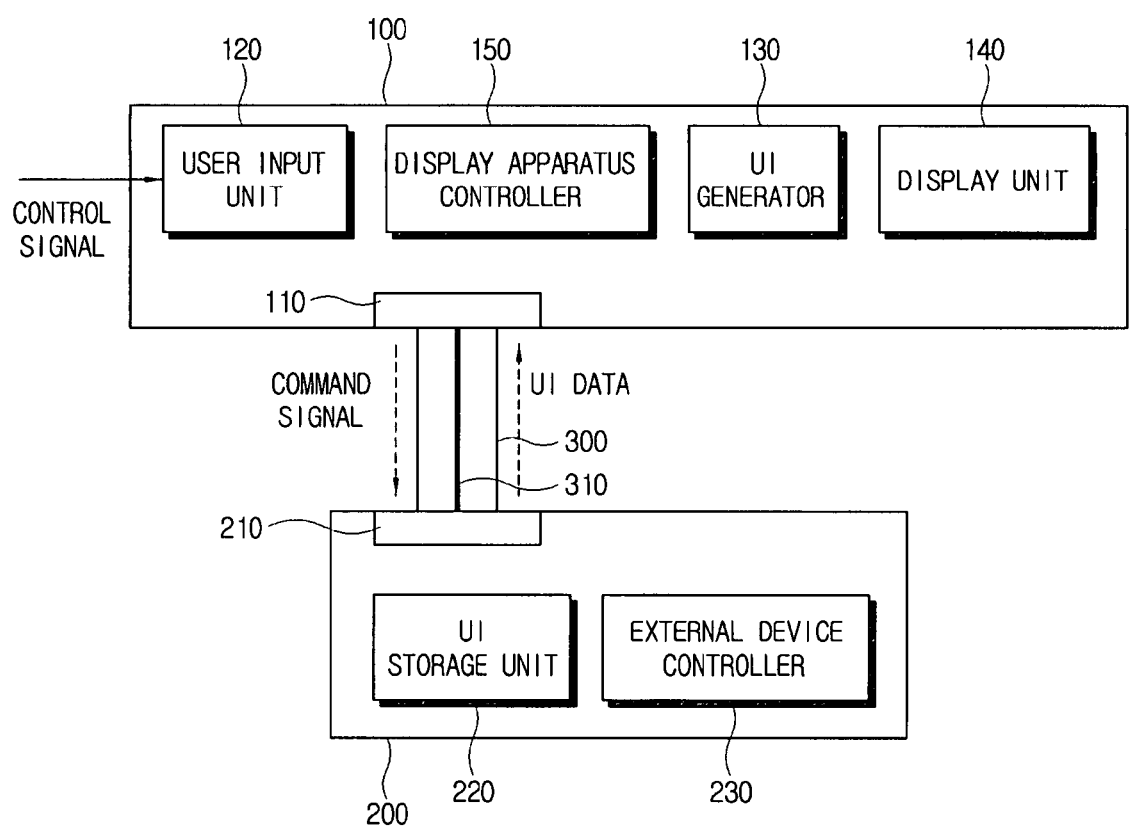
FIG. 2 is a control block diagram of a display system according to a first exemplary embodiment of the present invention.

FIG. 2 is a control block diagram of a display system according to a first exemplary embodiment of the present invention.

As shown in FIG. 2, the display system according to the first exemplary embodiment of the present invention includes a display apparatus 100, an external device 200, and a high definition multimedia interface (HDMI) cable 300 that connects the display apparatus 100 and the external device 200.

The display apparatus 100 includes a first HDMI 110, a user input unit 120, a user interface (UI) generator 130, a display unit 140, and a display apparatus controller 150. The first HDMI 110 is connected with the HDMI cable 300, and the display apparatus controller 150 controls the constituent elements 110, 120, 130, and 140 of the display apparatus 100. The external device 200 includes a second HDMI 210 corresponding to the first HDMI 110, a UI storage unit 220, and an external device controller 230 for controlling the second HDMI 210 and the UI storage unit 220.

The HDMI cable 300 includes a consumer electronics control (CEC) line 310 for transmitting/receiving a command signal and UI data between the display apparatus 100 and the external device 200.

The HDMI is an interface that can connect a digital audio signal and a digital video signal by using one cable without compressing the signals, and can transmit the audio signal through multiple channels. The HDMI is smaller than a digital video interface (DVI), and embedded with a high bandwidth digital content protect (HDCP) encryption function. In addition, the HDMI can be compatible with a DVI terminal since the HDMI supports an uncompressed digital interface.

As described, since the HDMI processes a video signal and a multi-channel audio signal through one cable, it has a simple cost effective structure, and therefore, generally used to connect an external device such as an audio-video (AV) device.

The first HDMI 110 and the second HDMI 210 of the display system according to the exemplary embodiment of the present invention correspond to a terminal that can be connected with the HDMI cable 300, which is a standard HDMI cable supporting the HDMI.

The user input unit 120 receives a control signal for controlling an image display state of the display apparatus 100 and a control signal for generating a UI such as an OSD.

The user input unit 120 can receive a control signal from a remote controller having a plurality of keys or buttons for controlling the display apparatus 100, or can receive a control signal through a button or a touch pad provided in an external frame of the display apparatus 100.

Throughout the specification, a signal received at the user input unit 120 will be called a "control signal" in order to distinguish from other signals.

The display unit 140 displays a video signal transmitted from the external device 200, and may be provided as a cathode ray tube (CRT), a liquid crystal display (LCD) panel including liquid crystal, an organic light emitting diode (OLED) including an organic light emitting element, or a plasma display panel (PDP). In addition, the display unit 140 display a UI for external device (or external device UI) generated by the UI generator 130.

The UI generator 130 generates the external device UI by control of the user input unit 120 and the display apparatus controller 150, and displays the external device UI on the display unit 140. The UI generator 130 not only generates the external device UI but also generates a UI for the display apparatus (or display apparatus UI), and therefore a user can control a brightness of the video signal, a contrast ratio, color temperature, resolution, or volume through the display apparatus UI.

The UI storage unit 220 provided in the external device 200, stores UI data for generating the external device UI. Conventionally, an external device transmits a UI window that corresponds to a video signal to a display apparatus so as to display an external device UI on the display apparatus. However, the external device 200 according to the exemplary embodiment of the present invention stores UI data (e.g., a text) for generating an UI in the UI storage unit 220 and transmits the stored UI data to the display apparatus 100 when a UI generation command signal is input.

When receiving the control signal for generating the external device UI through the user input unit 120, the display apparatus controller 150 outputs the UI generation command signal through the first HDMI 110 and, the external device controller 230 transmits the UI data stored in the UI storage unit 220 through the second HDMI 210 to the display apparatus 100.

Throughout the specification, a transmitted output signal from the display apparatus 100 to the external device 200 will be referred to as a "command signal" to distinguish from the control signal.

Figure 3A:
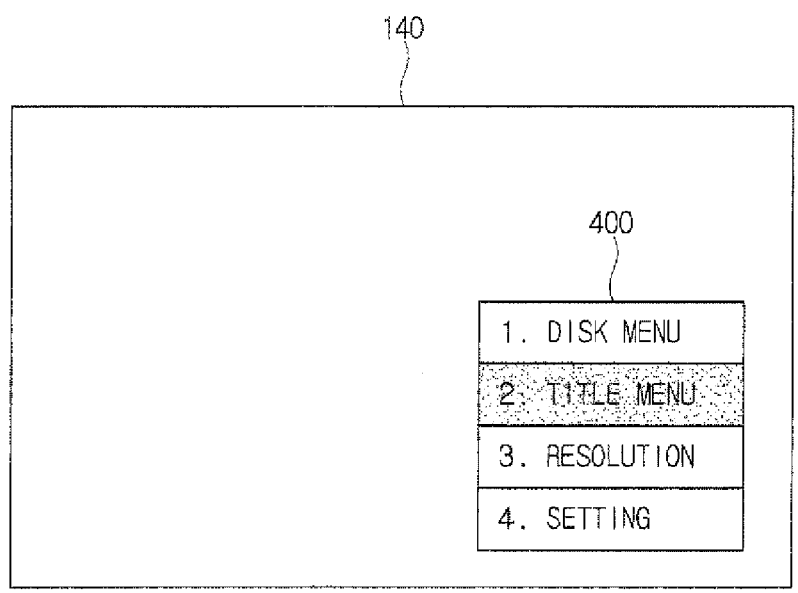
FIG. 3A to FIG. 3C show the UI for external device displayed on the display apparatus according to the exemplary embodiment of the present invention.
Figure 3B:
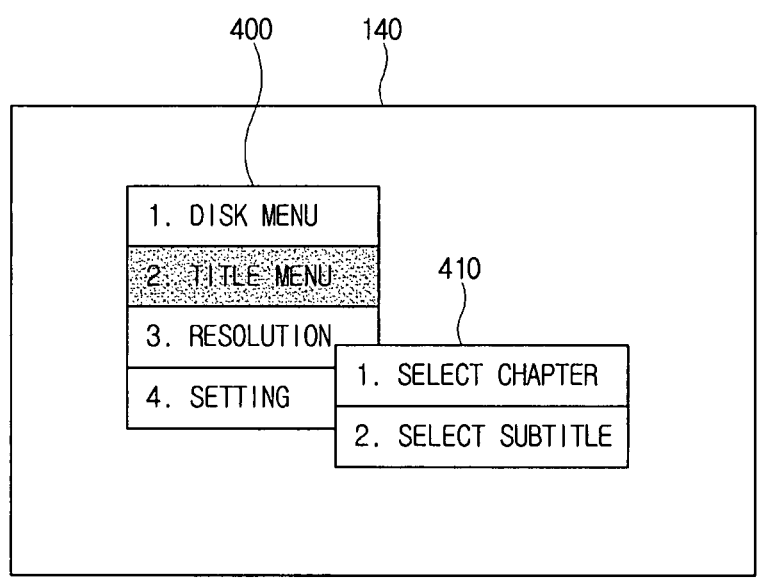
Figure 3C:
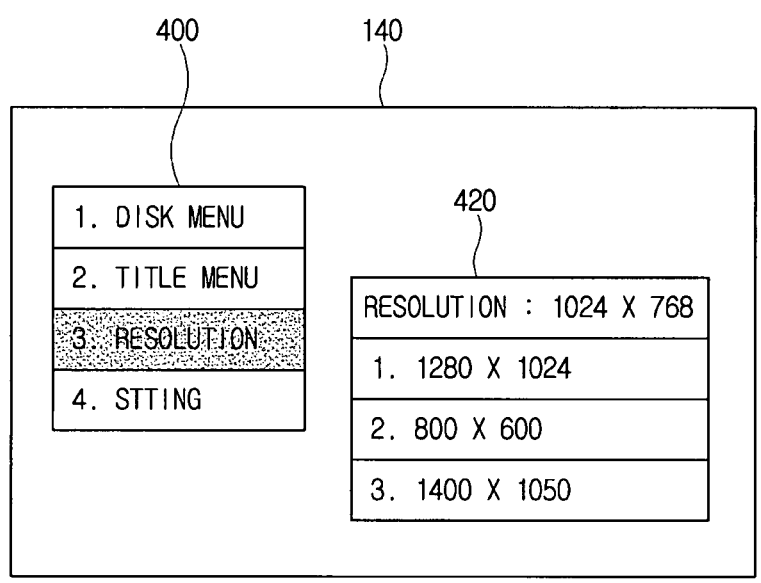
Figure 4:
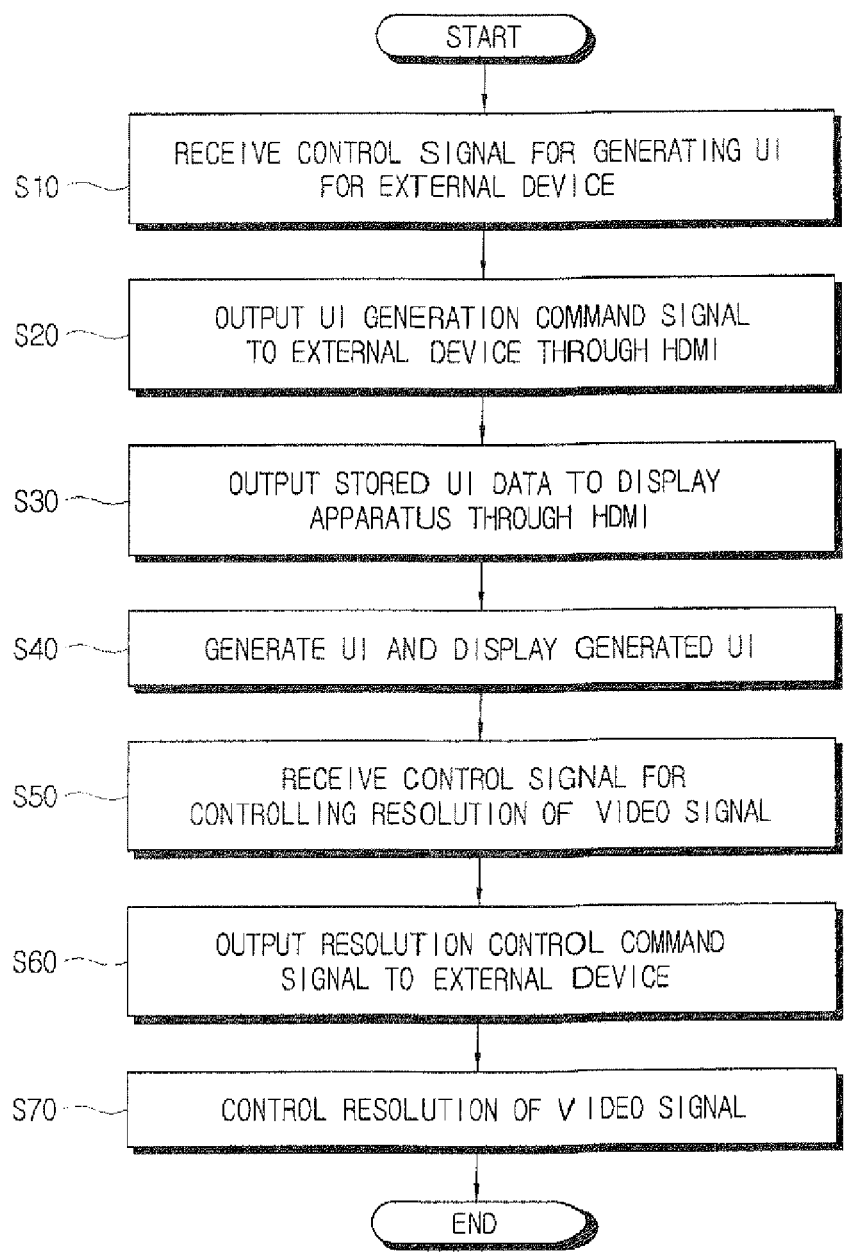
FIG. 4 is a control flowchart of a process for controlling the display system according to the exemplary embodiment of the present invention.

FIG. 3A to FIG. 3C show the external device UI displayed on the display apparatus according to the exemplary embodiment of the present invention, and FIG. 4 is a control flowchart of a process for controlling the display system according to the exemplary embodiment of the present invention.

A control method of the display apparatus controller 150 and the external device controller 230 will now be described with reference to FIG. 3A to FIG. 4.

A user can output the control signal for generating the external device UI through the remote controller or the button, and when the user input unit 120 receives the control signal for generating the external device UI at operation S10, the display apparatus controller 150 outputs the command signal for generating the external device UI to the external device 200 through the first HDMI 110 at operation of S20.

The CEC line 310 included in the HDMI cable 300 is a communication protocol supported by the HDMI for communication of specific data upon a user's request. The command signal and the UI data are transmitted through the CEC line 310 according to the exemplary embodiment of the present invention.

Conventionally, a display apparatus and an external device cannot communicate data with each other, and the display apparatus unilaterally transmits a predetermined number of command signals to the external device. Since the number of commands that can be transmitted to the external device from the display apparatus is limited, a specific command signal must be set for each external device connected to the display apparatus.

However, the display system according to the exemplary embodiment of the present invention enables data communication between the display apparatus 100 and the external device 200 by applying the communication protocol to the display apparatus 100 and the external device 200 through the CEC line 310.

In this case, for any external device connected to the display apparatus 100, the user can set or modify user-desired information on the external device through the display apparatus 100.

When receiving the command signal, the external device 200 outputs the stored UI data through the second HDMI 210 at operation S30. The UI generator 130 of the display apparatus 100 generates an external device UI by using the input UI data, and displays the external device UI on the display unit 140 at operation S40.

As shown in FIG. 3A, the external device UI includes an item list 400 including a plurality of items, and each item in the item list 400 is highlighted by locating a cursor for select. The plurality of items include a disk menu, a title menu, resolution, and setting. When the title menu is selected among the plurality of items, a sub-item 410 of the title menu is displayed as shown in FIG. 3B. That is, the command signal for the selected title menu is transmitted to the external device 200 through the first HDMI 110, then, the external device controller 230 transmits data corresponding to the sub-item 410 through the second HDMI 210.

FIG. 3C shows a resolution window 420 corresponding to a sub-item of the resolution in the item list 400.

The resolution window 420 displays resolution (1024*768) of the current external device 200, and also displays resolution change options that can be supported by the current external device 200.

Conventionally, when a video signal having resolution deviated from a supportable resolution range of the display apparatus 100, the video signal could not be displayed on the display apparatus.

However, according to the exemplary embodiment of the present invention, the user can change resolution of the video signal output from the external device 200 into resolution that can be displayed by the display apparatus 100.

When the user selects one of the resolution change options displayed on the resolution window 420, the user input unit 120 receives the control signal for controlling a resolution at operation S50 and the display apparatus controller 150 outputs the control command signal for controlling the resolution to the external device 200 at operation S60. The command signal for controlling the resolution is transmitted through the CEC line 310 to the external device 200, and the external device 200 receives the command signal and controls resolution of the corresponding video signal at operation S70.

The resolution control has been described in the present exemplary embodiment of the present invention, and other items included in the external device UI also can be modified or controlled. That is, the display system according to the exemplary embodiment of the present invention can display a convenient and simple external device UI, and resolution of the external device can be controlled through the external device UI.

In addition, when a cable is not properly connected between the display apparatus 100 and the external device 200 and thus an HDIP authentication failure error occurs, the external device UI can be generated through the user input unit 120 of the display apparatus 100.

As described above, a display apparatus that can display an external device UI by using a control signal received through a user input unit of the display apparatus, a display system, and a control method thereof are provided according to the present invention.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:
1. A display apparatus comprising:
a high definition multimedia interface (HDMI) through which an external device is adapted to be connected;
a user interface (UI) generator; and
a controller which outputs a command signal for generating a UI to control the external device, if supportable resolution of the display apparatus is different from a current resolution of the external device, and receives a UI data input from the external device through the HDMI when a control signal for generating the UI to control the external device is input, and
controls the UI generator to display the UI to control the external device based on the UI data input from the external device, wherein the UI data comprises text, the receiving comprises receiving the text, from the external device, through the HDMI, and
the generating comprises generating the UI to control the external device using the text.

2. The display apparatus of claim 1, further comprising a HDMI cable which is connected to the HDMI and includes a consumer electronics control (CEC) line,
wherein the command signal and the UI data for the UI to control the external device are transmitted through the CEC line.

3. The display apparatus of claim 1, wherein the UI generator is configured such that the UI to control the external device comprises an item list of a plurality of items, and
when one item of the plurality of items is selected, the controller outputs a command signal for the selected item through the HDMI.

4. A control method of a display apparatus having a high definition multimedia interface (HDMI) through which an external device is adapted to be connected, the control method comprising:
receiving a control signal for generating a user interface (UI) to control an external device;
outputting a command signal for generating the UI for the external device through the HDMI, if supportable resolution of the display apparatus is different from a current resolution of the external device;
receiving a UI data input from the external device; and
generating the UI to control the external device based on the UI data,
wherein the UI data comprises text,
the receiving comprises receiving the text, from the external device, through the HDMI, and
the generating comprises generating the UI to control the external device using the text.

5. The control method of claim 4, wherein the display apparatus further comprises a HDMI cable connected to the HDMI, wherein the HDMI cable comprises a consumer electronics control (CEC) line, and wherein the command signal and the UI data for the UI to control the external device are transmitted through the CEC line.

6. A display system comprising:
a display apparatus; and
an external device that is configured to be connected to the display apparatus;
the display apparatus comprises:
a display unit;
a first high definition multimedia interface (HDMI);
a user input unit;
a user interface (UI) generator; and
a display apparatus controller which outputs a command signal for generating a UI to control the external device through the first HDMI, if supportable resolution of the display apparatus is different from a current resolution of the external device, when a control signal for generating the UI to control the external device is input to the user input unit, and controls the UI generator to display the UI to control the external device on the display unit based on a UI data input from the external device, and
the external device comprises:
a second HDMI;
a UI storage unit which stores the UI data; and
an external device controller which outputs the stored UI data through the second HDMI when the command signal for generating the UI is received.

7. The display system of claim 6, further comprising an HDMI cable which is connected to the first HDMI and the second HDMI, and wherein the HDMI cable comprises a consumer electronics control (CEC) line,
wherein the command signal and the UI data for generating the UI are transmitted through the CEC line.

8. The display system of claim 6, wherein
the UI to control the external device comprises an item list of a plurality of items, and
when one item of the plurality of items in the item list is selected, the display apparatus outputs a command signal for the selected item through the first HDMI.

9. The display system of claim 8, wherein, when the command signal for the selected item is input, the external device outputs a sub-item data of the selected item through the second HDMI.

10. The display system of claim 6, wherein the UI to control the external device comprises a resolution window for controlling resolution data and a resolution of a video signal output from the external device, and
when the user input unit receives a control signal for controlling the resolution of the video signal, the external device controls the resolution of the video signal based on the control signal.

11. A control method of a display system comprising an external device, a display apparatus having a display unit, and a high definition multimedia interface (HDMI) which connects the display apparatus and the external device, the control method comprising:
receiving a control signal for generating a UI to control an external device;
outputting, to the external device, a command signal for generating the UI to control the external device through the HDMI, if supportable resolution of the display apparatus is different from a current resolution of the external device;
outputting a stored UI data to the display apparatus through the HDMI when the command signal for generating the UI to control the external device is received; and
generating the UI to control the external device based on the stored UI data received from the external device, and displaying the generated UI to control the external device on the display unit,
wherein the stored UI data comprises text,
the outputting comprises outputting the text through the HDMI, and
the generating comprises generating the UI to control the external device using the text.

12. The control method of claim 11, wherein the UI to control the external device displayed on the display unit comprises a resolution window for controlling a resolution data and a resolution of a video signal output from the external device, and
the control method further comprises:
receiving a control signal for controlling the resolution of the video signal;
outputting a command signal for controlling the resolution of the video signal to the external device; and
controlling the resolution of the video signal.

13. A display apparatus according to claim 1, further comprising a display unit.

14. A display apparatus according to claim 1, further comprising a user input unit.

15. The display apparatus according to claim 1, wherein the external device and the display apparatus are connected through and communicate with one another bilaterally via the HDMI.

16. The display apparatus according to claim 1, further comprising:
    a remote controller which is configured to control functions of the display apparatus, and
    further configured to transmit the control signal for generating the UI to control the external device.

17. The display apparatus according to claim 1, wherein the UI to control the external device comprises a menu for controlling the external device.

18. The display apparatus of claim 1, wherein the UI generator is configured to generate the UI from the text.

\* \* \* \* \*